United States Patent [19]

Voser

[11] Patent Number: 5,044,722

[45] Date of Patent: Sep. 3, 1991

[54] SELF-SUPPORTING OPTICAL CABLE

[75] Inventor: Othmar Voser, Möriken, Switzerland

[73] Assignee: Kupferdraht-Isolierwerk AG, Wildegg, Switzerland

[21] Appl. No.: 548,966

[22] PCT Filed: Nov. 21, 1989

[86] PCT No.: PCT/CH89/00204

§ 371 Date: Jul. 30, 1990

§ 102(e) Date: Jul. 30, 1990

[87] PCT Pub. No.: WO90/06530

PCT Pub. Date: Jun. 14, 1990

[30] Foreign Application Priority Data

Dec. 5, 1988 [CH] Switzerland ............... 4501/88

[51] Int. Cl.⁵ .............................. G02B 6/44
[52] U.S. Cl. .............................. 385/113
[58] Field of Search ...................... 350/96.23

[56] References Cited

U.S. PATENT DOCUMENTS 4,496,214 1/1985 Oestreich et al. ............ 350/96.23
4,514,058 4/1985 Walton ...................... 350/96.23
4,690,497 9/1987 Occhini et al. .............. 350/96.23

FOREIGN PATENT DOCUMENTS 2090995 7/1982 United Kingdom .

Primary Examiner—William L. Sikes
Assistant Examiner—Robert E. Wise
Attorney, Agent, or Firm—Notaro & Michalos

[57] ABSTRACT

An optical cable has a core (1) which comprises at least one optical conductor (7) stranded around a central member (6). The core (1) with the optical conductors (7) is enclosed by a reinforcing layer (2) comprising strength members (11). These strength members (11) are profiled bodies with flat cross section wherein the side faces (12, 13) of adjacent members (11) are in contact with each other and support each other. The strength members (11) form around the core (1) a closed jacket stable against changes of diameter. The optical conductors (7) are stranded around the central member (6) so that after each turn the direction of stranding changes, i.e. one turn to the right, the next to the left, then again to the right, etc. Thereby a wave-like stranding of the optical conductors (7) is formed.

16 Claims, 4 Drawing Sheets

SELF-SUPPORTING OPTICAL CABLE

FIELD AND BACKGROUND OF THE INVENTION

The invention relates to a self-supporting optical cable with a core comprising at least one optical conductor and a central member with several strength members disposed in a concentric reinforcing layer about this core and at a distance to it wherein these members form a compression-proof jacket, and an external protective jacket.

Several cables of this type are known in several types of implementation. It must be taken into consideration that optical conductors are extraordinarily sensitive to tensile loads, pressure, and bending loads. The strength members or the reinforcing layer therefore have the task to relieve in optimal manner the strain due to tensile and bending loads of the optical conductors encompassed by them. From the French Patent Application with the publication number 2 444 282 is known an ocean cable with optical conductors of high tensile and pressure strength which has a compression-proof rigid jacket. This jacket is formed of a multiplicity of profiled steel wires that are disposed so as to be laterally in contact with each other and whose height is greater than their width. Therefore the compression-proof jacket, and consequently the described cable, is very heavy and rigid. Such a cable is unsuitable as a self-supporting cable, in particular as an overhead line, and is therefore used only as an ocean cable.

An aerial cable with a tubular support member and optical conductors is known from Patent DE 33 19 370 A1. The optical conductors are herein inserted loosely into a central protective conduit. This protective conduit is surrounded by a closed jacket of resin which contains tension-proof fibers. This jacket has a diameter greater by a multiple than the diameter of the protective conduit for the optical conductors. If a soft resin is used for the jacket so that the cable remains flexible then the jacket is no longer compression-proof. If the resin is so hard that radial pressure loads can also be absorbed, a relatively rigid cable results which cannot be readily handled. Although this cable structure protects the optical conductors well, the optical conductors can be stretched or bent impressibly since their disposition in the protective conduits is not defined and can also not be checked. If a moderately large number of optical conductors is installed in such a cable they can disturb each other and place a mechanical stress on each other which leads to damages. The security of this cable construction is insufficient for the optical conductors and the cable is susceptible to interference.

A further optical cable which is said to avoid to above stated disadvantages is known according to Patent Application EP 150 768 A2 wherein the strength members are stranded around the optical conductors. Therein the strength and armouring members are said to be stranded around the core in a particular direction of turn and a length of turn to be calculated. Only when strictly adhering to this disposition are the optical fibers protected against tensile load. The formula given for the determination of turn length and twist diameter of the armouring members permits a theoretical determination. Important factors of influence such as physical constants and geometric data with different cable structures as well as adhesion between the individual cable layers cannot be determined mathematically and must therefore be determined experimentally. This causes considerable expenditures in the development of such cables and the appropriate experiments must be carried out anew with each change of the cable structure or the geometric shape. Furthermore, this cable structure does not protect the optical conductors disposed in the interior against pressure loads which can occur transversely to the longitudinal direction of the cable.

SUMMARY OF THE INVENTION

The invention is based on the task of creating a cable structure for self-supporting optical cables in which the optical conductors do not interfere mechanically with each other or damage each other and the strength members in a reinforcing layer protect the optical conductors against tensile loads as well as loads due to bending and pressure. The protective members act against damaging mechanical loads and the optical conductors are mechanically separated from each other. The cable structure are simple and equally suitable for all dimensions. Furthermore, different embodiments of the twist direction and the length of turn of the reniforcing members are possible.

The task of the invention is achieved through the features defined in the claims herein.

With the solution according to the invention at least one optical conductor is disposed around a central member in the center of the cable wherein this central member and a single or several optical conductors in known manner with or without filling worming form the core. The strength members disposed concentrically around the core are longitudinally profiled bodies which are disposed in the reinforcing layer laterally in contact with each other and which support each other. The support takes place through direct contact of the side faces and via the filling material disposed between the side faces. The profiled bodies have a flat cross section with two side faces. The side faces of each two adjacent strength members in the reinforcing layer are in contact with each other either directly or via the filing material. The reinforcing members thus form a closed jacket around the core which are self-supporting when tensile and pressure loads are placed on it and cannot collapse onto itself. On bending the cable according to the invention, the individual strength members also support each other and prevent a compression or flattening of the annularly shaped cross section of the reinforcing layer whereby the optical conductors in the interior are also protected against such pressure loads. The strength members are formed by reinforcing fibers embedded in resin. Suitable known reinforcing fibers are glass fibers, carbon fibers or so-called Kevlar fibers. Kevlar is a trademark of DuPont. Tensile load is applied in the longitudinal direction of the cable the tensile forces are absorbed by the strength members without the diameter of the reinforcing layer being restricted. This is a consequence of the fact that the members of the reinforcing layer are supported on each other. Potential alteration of the length causes no elongation of the optical conductors but rather only a stretching of the bending radius in the region of the change of the direction of stranding. Since the optical conductors surround the central member only in a wave line and do not encompass it completely, they can be spring-like in the longitudinal direction. The length of turn according to the invention and the change of the direction of stranding after each turn allow the movement of the optical conductors within the cable which are decoupled from the movements of the strength members and specifically under tensile and pressure loads as well as also on bending of the cable. This mobility is supported additionally through the separating layer between the core and the reinforcing layer. The core with the optical conductors in terms of mechanical loads is decoupled completely from the strength members or the reinforcing layer. The advantageous effect of this invention is achieved independently of the direction of stranding and the length of turn of the strength members. The resistance to tensile pressure and bending loads is determined, on the one hand, by the geometric implementation of the strength members comprising profiled bodies and their arrangement in the reinforcing layer and, on the other hand, by the special type of imbedding of the optical conductors around a central member. The combination of these features allows the manufacture of light and flexible cables of high strength. With the disposition of a further jacket around the reinforcing layer the solution according to the invention allows also the implementation of cables in which the strength members extent with very large turn lengths around the axis of the cable. Therein the additional jacket is implemented of synthetic material alone or with additional strength members. With suitable implementation or disposition of the strength member the outer jacket reaches into intermediate spaces between the strength members and is anchored in them. This prevents the sliding of the outer jacket relative to the reinforcing layer. By applying an additional coating of colophonium or other adhesive or resin on the strength members untwisting of the stranding under tensile load can be prevented. The structure according to the invention of an optical cable allows the manufacture of especially resistant and yet flexible as well as light cables which are easy to manufacture. If necessary the cable can be equipped in known manner with additional metallic conductors.

BRIEF DESCRIPTION OF THE DRAWINGS

The invention is explained in greater detail in conjunction with advantageous embodiments which are represented in the drawings wherein.

DESCRIPTION OF THE PREFERRED EMBODIMENTS

Figure 1:
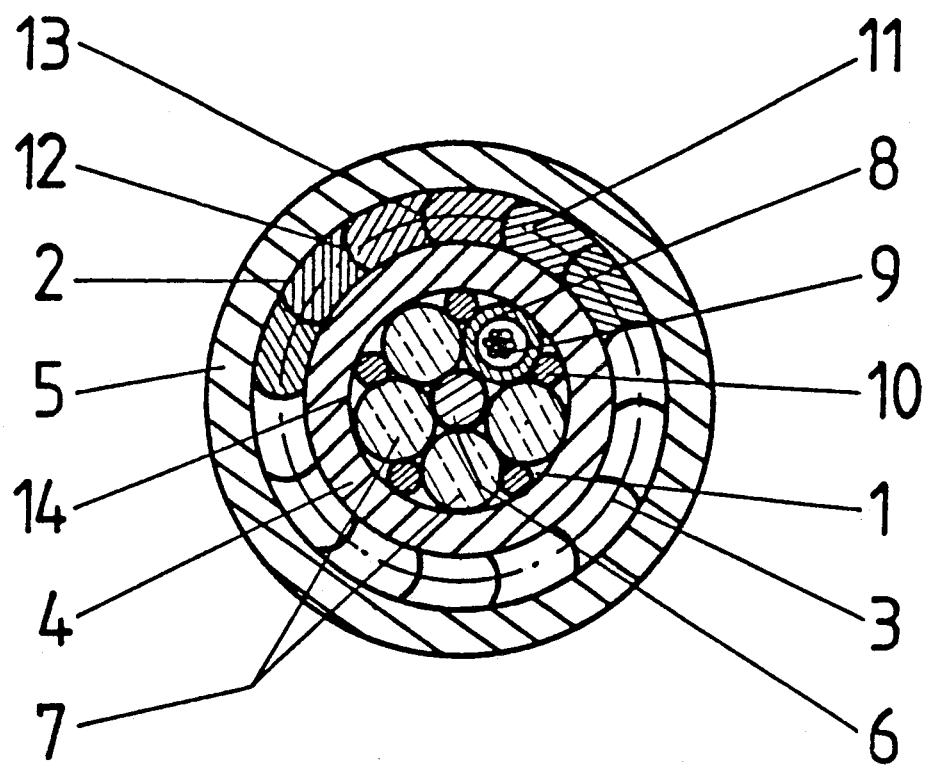
FIG. 1 is a cross section through an optical cable according to the invention.

The cable according to FIG. 1 comprises a central member 6 disposed in the center and several optical conductors 7 disposed concentrically around it. These optical conductors 7 comprise a protective conduit 8 and optical fibers 9 disposed thereon which can move axially freely in the protective conduit 8. The intermediate spaces between the optical conductors 7 are provided in known manner with filling members 10. The central member 6 and the optical conductors 7 as well as the filling members 10 form the core 1 of the cable.

Around the core 1 a separating layer 14 and a protective jacket 4 are applied which protect the optical conductors 7 during the further processing against damage and facilitates the subsequent application of a reinforcing layer 2. In the example shown the separating layer 14 comprises two layers of tape wound thereon wherein one layer comprises a polyester film and the other layer a nonwoven fiber tissue. These two layers have, with respect to each other, good slidability. The protective jacket 4 is implemented of polyethylene. These material combinations offer insurance for a separating effect between the separating layer 14 and the protective jacket 4. The reinforcing layer 2 comprises strength members 11 which have approximately a rectangular cross section. These strength members 11 are long profiled bodies with flat cross section formed of reinforcing fibers and a curable resin. The reinforcing fibers are so-called chemical fibers, for example glass fibers, carbon fibers or aramide fibers, which are cross-linked with a suitable resin and formed into profiled rods before stranding. The strength members 11 have each two side faces 12, 13 wherein the side face 12 is formed convexly and the side face 13 concavely. The strength members 11 are disposed concentrically around the core 1 along a central diameter circle 3 and form a closed reinforcing jacket. The disposition of the reinforcing members 11 is chosen so that one convex side face 12 engages the concave side face 13 of the adjacent strength member 11 and thereby a form closure lamination layer is formed. Above the reinforcing layer 2 again in known manner, a cable jacket 5 is applied which protects the underlying cable layers against atmospheric influences and damaging radiation. The reinforcing members 11 are stranded around the core 1 and absorb all tensile loads acting upon the cable. During bending or lateral pressure loads placed on the cable they form a deformation-stable jacket which protects the optical conductors 7 against pressure loads. The strength members 11 through the form closure connection of the side faces form already a very stable joining which is further reinforced through the cable jacket 5 and the protective jacket 4. Cable jacket 5 and protective jacket 4 bring about the effect whereby the strength members 11 cannot be deflected out of their mutual position even under extreme load. The cable shown in FIG. 1 has an outer diameter of approximately 20 mm and the strength members 11 and 3 mm wide and 2 mm high.

Figure 2:
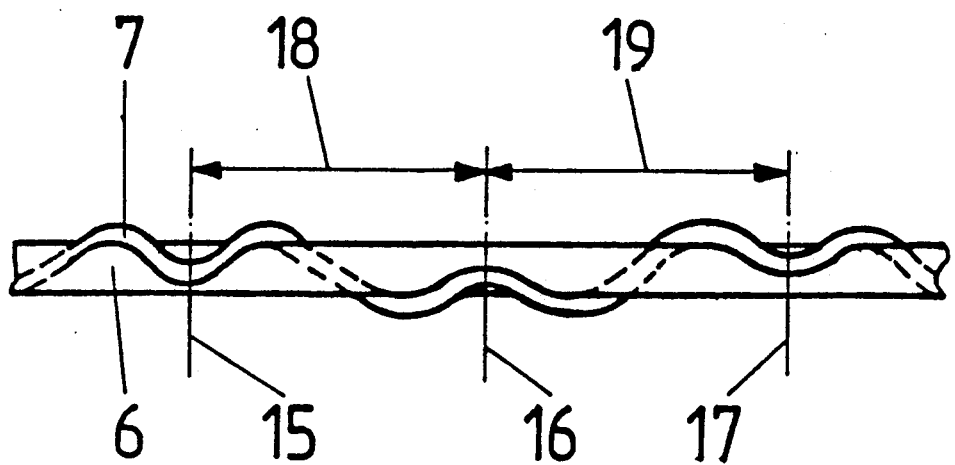
FIG. 2 is a schematic representation of the arrangement of an individual optical conductor on the central member.

FIG. 2 shows schematically how the optical conductors 7 are stranded or arranged around the central member 6. For the sake of simplification only the optical conductor 7 is represented although the layer comprises five such conductors 7 extending in parallel. The central member 6 is formed of a known suitable material for example of polyethylene reinforced with Kevlar fibers or of glass fibers embedded in resin. The optical conductor 7 is stranded in a waveform around the central member 6 wherein the direction of the stranding changes in each instance after each turn at the points 15, 16, and 17. One turn corresponds therein to the length of the arrows 18 or 19, respectively. In the area of the length of the arrow 18 the optical conductor 7 is therefore stranded toward the left and in the area of the arrow 19 toward the right. The length of the individual turns is selected so that the curvature of the optical conductor 7 in the area of the turning points 15, 16, and 17 is less than the permissible curvature. In the example represented the turn length 18, 19 is approximately 85 mm wherein the central member has a diameter of 2.5 mm and the optical conductors 7 a diameter of 3 mm. The length 18, 19 of each turn is selected to be at least five times the diameter of the turn, that is the diameter of central member 6 plus one diameter of an optical conductor 7. On bending the entire cable the optical conductors 7 can adapt spring-like to the compressions and extensions without the critical curvature being exceeded in any place. The movements of the optical conductors 7 are completely independent of the movements of the strength members and decoupled from them. Constrictions of the optical conductors 7 around the central member 6 are not possible and consequently no disturbing radial pressures on the optical conductors are not generated.

Figure 3:
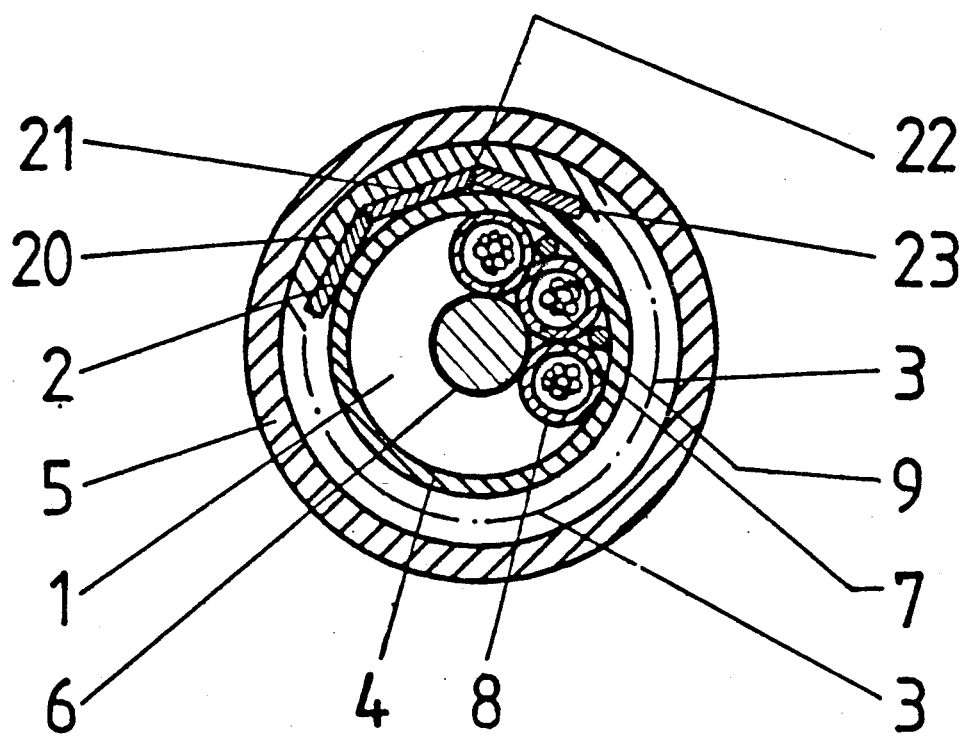
FIG. 3 is a cross section through an optical cable according to the invention with a lamination layer.

The cable according to FIG. 3 likewise has a core 1 comprising a central member 6 and optical conductors 7 with protective conduits 8 and optical fibers 9. The core 1 is surrounded by a protective jacket 4 and the outer surface of the cable is again bounded by a cable jacket 5. The reinforcing layer 2 comprises in this example strength members 21 having the shape of flat rectangular rods. The strength members 21 have side faces 22 and 23 which in the area of the central diameter circle 3 are in contact with each other. The side faces 22, 23 intersect the periphery of the central diameter circle 3 approximately at right angles. Onto the reinforcing layer 2 or the strength members 21 stranded concentrically around the core 1 an additional jacket 20 is extruded forming with the strength members 21 a laminate layer and filling potential gaps between the side faces 22, 23. Thereby an extraordinarily stable reinforcing layer 2 results and the jacket 20 is anchored between the strength members 21. The additional jacket 20 can comprise the same material as the cable jacket 5 or another material with particularly good binding properties. Since the cross sectional shape of the strength members 21 is simple these profiled bodies can be produced very simply and can also be adapted readily to the different diameter dimensions or the circle 3. This embodiment of a cable according to the invention is especially suitable for application as aerial cable with relatively small span for example up to 100 meters. As strength members 21 rectangular profiled rods with the dimensions 6×0.5 mm are used therein. The side faces can also be vaulted in the outward direction. The rods comprise a multiplicity of rope-like parallel threads disposed next to one another of chemical fibers which are impregnated with a two-component resin and cured. These strength members 21 can absorb very high tension forces due to their orientation relative to the longitudinal direction of the cables yet allow nevertheless the desired flexibility of the cable. In each embodiment each strength member has a dimension between its side faces which is at least 1.3 times its dimension in the radial direction of said core.

Figure 5:
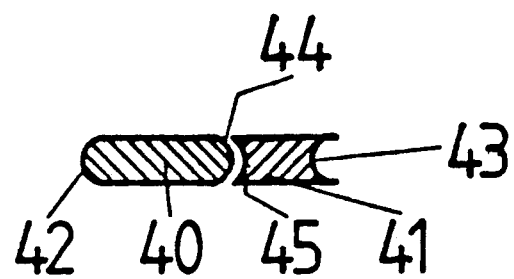
FIG. 5 is a cross section of two strength members with concave or convex side faces respectively.
Figure 4:
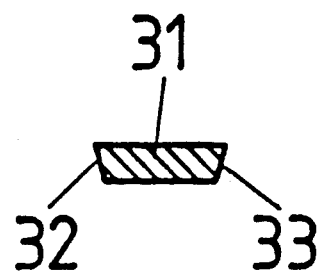
FIG. 4 is a cross section through a reinforcing member with trapezoidal profile.

In FIG. 4 is shown a further strength member 31 whose cross section can be produced relatively easily. The cross-sectional area has therein the shape of a trapezoid wherein the shanks of the trapezoid form the side faces 32 and 33. When using these profiled bodies as strength members 31 a particular form- and pressure-stable jacket results since the individual strength members 31 support each other vault-like. A further embodiment of reinforcing members 40, 41 is shown in FIG. 5 wherein here reinforcing members with two different cross-sectional areas are combined with each other. The reinforcing member 40 has a flat rectangular cross section wherein the two side faces 42, 44 are vaulted convexly in the outward direction. The adjacent reinforcing member 41 has side faces 43, 45 which are curved in the same manner, however concavely in the inward direction, this combination of strength members 40, 41 allows the use of members with identical cross-sectional measurements for differently sized central diameter circles 3. This is possible because these members 40, 41 can be adjoined laterally at different angle without the form closure connection being removed.

In all embodiments of the strength members 11, 21, 31, 40, and 41 the fact prooves to be particularly advantageous that the reinforcing layer 2 does not become constricted when tensile loads are placed on the cable in the longitudinal direction. This is a consequence of the lateral support and the form closure connection between the sides faces 12, 13 according to FIG. 1, 22, 23 according to FIG. 3, 32, 33 according to FIG. 4, and 42, 44 or 43, 45 respectively in FIG. 5. Therefore no tensions due to tensile load on the cable act upon the optical conductors 7 disposed in the area of the core 1. Even if only one optical conductor 7 with corresponding filling members 10 is located in the core 1 a form- and load-stable cable results in which the light waveguide 7 is not deformed impermissibly with permissible bending or tensile loads.

Extension of the cable are, as described in connection with FIG. 2, compensated through the stranding according to the invention of the optical conductors 7 around the central member 6 thereby the optical conductors 7 in the are of the turning points of the stranding direction can be spring-like. These position changes are so small that no disturbing loads of the optical conductors 7 or the optical fibers 9 occur. The sensitive optical fibers 9 are thus protected multiply: First through the strength members 11, 21, 31, 40, and 41 or the reinforcing layer 2 formed by them, secondly through the special stranding of the optical conductors 7 around the central member 6, and thirdly through the loose arrangement of the optical fibers 9 in the protective conduit 8 of the optical conductors 7. The cables according to the invention are suitable for overhead lines as well as for laying in cable shafts or other types of laying.

What is claimed:
1. A self-supporting optical cable, comprising:
 a central member;
 at least one optical conductor stranded around said central member in a plurality of turns which change direction substantially after each turn and which have a diameter around said central member, each turn having a length which is at least five times the diameter of the turn, said central member and said at least one optical conductor forming a core;
 a plurality of strength members positioned around and at a distance from said core, each strength member comprising an elongated profiled body having a substantially flat cross section and formed at least partly of reinforcing fibers, each strength member having a pair of opposite side faces which engage side faces of adjacent strength members around said core to form a compression-proof closed jacket around said core which is stable against changes of diameter of said jacket; and
 an outer protective jacket around said closed jacket.
2. A cable according to claim 1 including a separating layer comprising at least one wound tape, wound around said core, between said core and said closed jacket.

3. A cable according to claim 1 including a separating layer wound of at least one synthetic film around said core between said core and said closed jacket.

4. A cable according to claim 1 wherein each strength member comprises a multiplicity of rope-like parallel threads disposed adjacent each other and impregnated with cured resin.

5. A cable according to claim 1 wherein each strength member has a dimension between its side faces which is at least 1.3 times its dimension in a radial direction of said core.

6. A cable according to claim 5 wherein each strength member has a trapezoidal cross section, said side faces of each strength member comprising opposite shanks of a trapezoid which converge toward a center of said central member.

7. A cable according to claim 5 wherein each strength member has a substantially rectangular cross section, one side face of each strength member being concave and another side face of each strength member being convex, a convex side face of one strength member being engaged with a concave side face of an adjacent strength member.

8. A cable according to claim 5 wherein each strength member has a substantially rectangular cross section, alternating strength members around said closed jacket having two concave side faces and remaining strength members around said closed jacket having convex side faces which engage with concave side faces of adjacent alternating strength members.

9. A cable according to claim 1 wherein each strength member is coated with an adhesive.

10. A cable according to claim 9 wherein said adhesive is resin.

11. A cable according to claim 10 wherein said resin is colophonium.

12. A cable according to claim 1 including an intermediate layer between said core and said closed jacket, made of protective filing material, said intermediate layer being concentric with said core, with said closed jacket and with said outer protective jacket.

13. A cable according to claim 1 including an additional jacket laminated to and around said closed jacket, between said closed jacket and said outer protective jacket.

14. A cable according to claim 13 wherein said strength members have spaces therebetween around said closed jacket, material from said additional jacket extending into and filling said spaces.

15. A cable according to claim 1 wherein said strength members define spaces therebetween around said closed jacket, material from said outer protective jacket extending into and filling said spaces.

16. A cable according to claim 1 including at least one metallic conductor stranded on said central member, in addition to said at least one optical conductor.

* * * * *